United States Patent
Abed et al.

(10) Patent No.: US 9,471,607 B2
(45) Date of Patent: Oct. 18, 2016

(54) DATA LOADING TOOL

(71) Applicant: International Business Machines Corporation, Armonk, NY (US)

(72) Inventors: Sami Abed, Dublin (IE); Austin Clifford, Dublin (IE); Konrad Emanowicz, Dublin (IE); Gareth Jenkins, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 287 days.

(21) Appl. No.: 13/966,360

(22) Filed: Aug. 14, 2013

(65) Prior Publication Data

US 2014/0114924 A1    Apr. 24, 2014

(51) Int. Cl.
 *G06F 17/30* (2006.01)
(52) U.S. Cl.
 CPC .............................. *G06F 17/30289* (2013.01)
(58) Field of Classification Search
 CPC .................... G06F 17/30289; G06F 17/30375
 See application file for complete search history.

(56) References Cited

U.S. PATENT DOCUMENTS

| | | |
|---|---|---|
| 5,758,337 A | 5/1998 | Hammond |
| 6,047,294 A | 4/2000 | Deshayes et al. |
| 7,870,113 B2 | 1/2011 | Gruenwald |
| 7,873,598 B2 | 1/2011 | Shi et al. |
| 8,065,277 B1 | 11/2011 | Gardner et al. |
| 8,103,632 B2 | 1/2012 | Schmidt et al. |
| 2003/0177146 A1* | 9/2003 | Zimowski ............... 707/200 |
| 2006/0242205 A1 | 10/2006 | Schmidt et al. |
| 2008/0033960 A1* | 2/2008 | Banks et al. ............. 707/9 |

OTHER PUBLICATIONS

Garrett et al. "Best Practices Using IBM Inforsphere Optim High Performance Unload as part of a Recovery Strategy", Issued Nov. 2011.*
IBM "Data Recovery and High Availability Guide and Reference", updated Jul. 2012.*
"HP OpenView Data Extraction and Reporting: Creating the reports you need using HP OpenView products and PC-based reporting tools", HP OpenView Integration Lab, Hewlett-Packard Company. Version 1.02, Feb. 22, 1999, pp. 1-88.
Price, "Grid-tools Data Fit for Purpose: A guide to database subsetting", retrieved on Aug. 13, 2013 from http://www.grid-tools.com/download/Guide_Database_Subsetting.pdf; pp. 1-41.

* cited by examiner

*Primary Examiner* — Apu Mofiz
*Assistant Examiner* — Cindy Nguyen
(74) *Attorney, Agent, or Firm* — Cantor Colburn LLP

(57) ABSTRACT

In an exemplary embodiment of this disclosure, a method for loading data from a backup image of a database includes selecting a subset statement defining a subset of the data in the database. Tables of the database are identified based on metadata of the database. A target database is written having the structure but not the data of the identified tables. One or more table statements are constructed, by a computer processor, defining a subset of each identified table based on the subset statement. Selected data is unloaded from a backup image into the target database using respective table statements as filters.

18 Claims, 9 Drawing Sheets

DATA LOADING TOOL

CROSS-REFERENCE TO RELATED APPLICATIONS

This application claims priority to Great Britain Patent Application No. 1218781.1, filed Oct. 19, 2012, and all the benefits accruing therefrom under 35 U.S.C. §119, the contents of which in its entirety are herein incorporated by reference.

BACKGROUND

Various embodiments of this invention relate to database tools and, more particularly, to a data loading tool.

There is often a requirement to replicate a subset of data in a production database for development, testing or offline point-in-time reporting requirements. This subset of data will generally be a logical subset, for example, all data relating to a specific geographical region or a branch office and perhaps all data in the database for a specific monthly range. Typically, a database designer will attempt to eliminate duplication and store data properties in separate associated tables. Therefore, to extract a logical subset, related data in each associated table must be identified through successive join operations using foreign key relationships between the tables.

Given the challenging workload requirements on production systems, it is often impractical to run select queries with join operators against the production database directly to extract the datasets.

Furthermore, a target system will often be much smaller than the full-scale production system and would typically not have enough disk storage available to facilitate a full database restore of the production database, before using a complex structured query language (SQL) statement to extract the required subset dataset.

Patent publication US20060242205A1, "Self-contained partial database backups," outlines an approach for creating a subset of a database, which might be useful in the above situation. The approach involves a database restore operation from the database subset whereby the subset consists of file groups and associated metadata.

U.S. Pat. No. 6,047,294, "Logical restore from a physical backup in a computer storage system," outlines an approach for backing up and restoring data in computer system. A segment of data, such as a virtual disk partition, is backed up at a physical level from a primary storage device, and a logical element within the segment may be restored. The solution assumes the logical element is always a file.

The main drawback of these previous solutions is that the smallest logical subset a user can extract for the target system is a file. Considering the size of the production systems, the files and file groups of the backup structure are too large for the target test system and do not provide a specific small logical subset of data desired by the user (generally a subset of rows from a set of related tables in the database).

SUMMARY

In a first exemplary embodiment of this disclosure, a method for loading data from a backup image of a database includes selecting a subset statement defining a subset of the data in the database. Tables of the database are identified based on metadata of the database. A target database is written having the structure but not the data of the identified tables. One or more table statements are constructed, by a computer processor, defining a subset of each identified table based on the subset statement. Selected data is unloaded from a backup image into the target database using respective table statements as filters.

In a second embodiment, a computer program product includes a computer readable storage medium having computer readable program code embodied thereon. The computer readable program code is executable by a processor to perform a method. The method includes selecting a subset statement defining a subset of the data in the database. Further according to the method, tables of the database are identified based on metadata of the database. A target database is written having the structure but not the data of the identified tables. One or more table statements are constructed defining a subset of each identified table based on the subset statement. Selected data is unloaded from a backup image into the target database using respective table statements as filters.

In a third embodiment, a data loading apparatus for loading data from a backup image of a database includes a selector, an identifier, a writer, a builder, and an unloader. The selector is configured to select a subset statement defining a subset of the data in the database. The identifier is configured to identify tables of the database based on metadata of the database. The writer is configured to write a target database having the structure but not the data of the identified tables. The builder is configured to construct one or more table statements defining a subset of each identified table based on the subset statement. The unloader is configured to unload selected data from the backup image into the target database using respective table statements as filters.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

Exemplary embodiments of the present invention will now be described, by way of example only, with reference to the following drawings in which.

DETAILED DESCRIPTION

Figure 1:
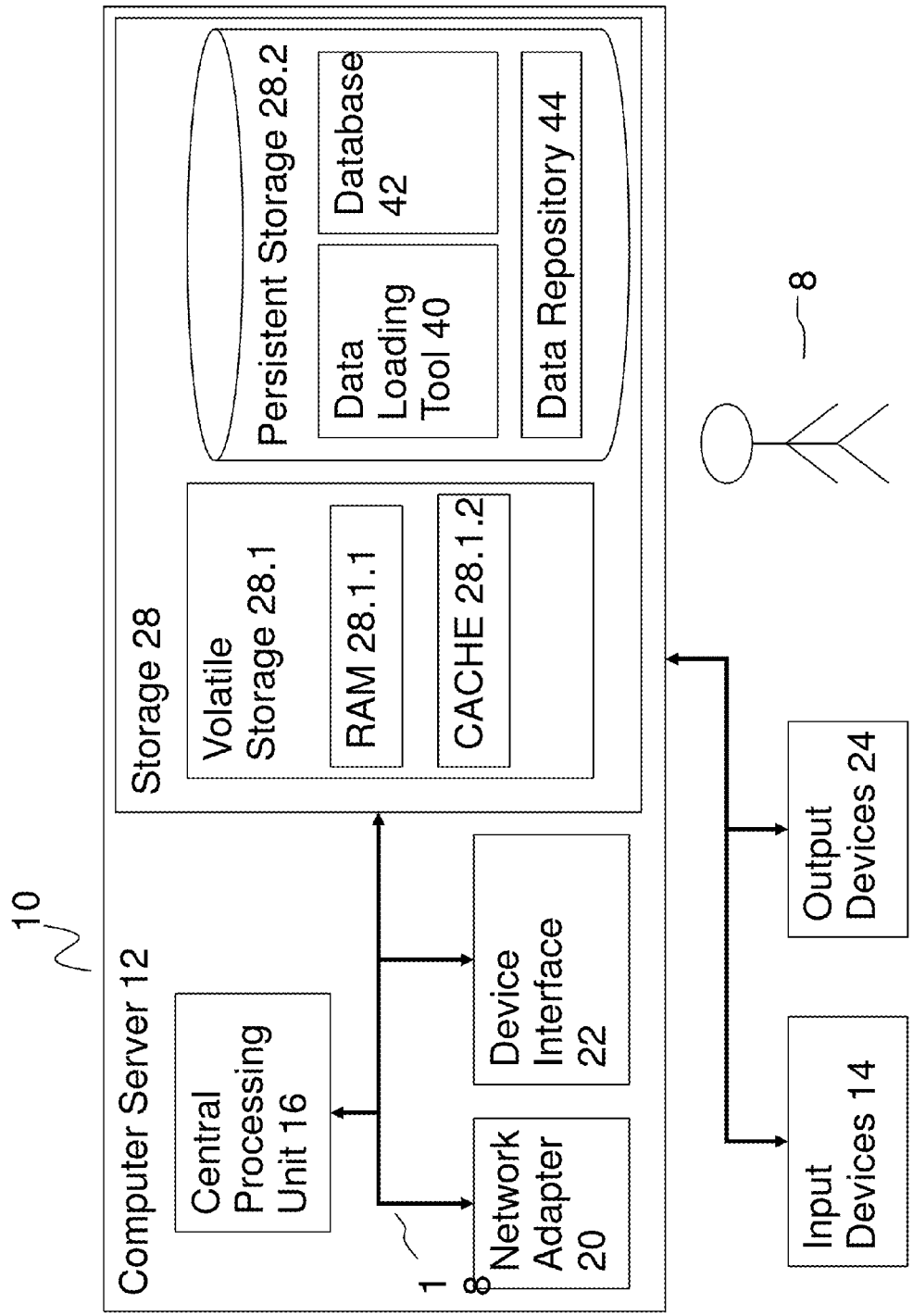
FIG. 1 is a deployment diagram of an exemplary embodiment of the invention in a computer system.

Referring to FIG. 1, an exemplary embodiment may include a data loading tool 40 deployed with database 42 in computer processing system 10. Computer processing system 10 may be operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer system. Generally, program modules may include routines, programs, objects, components, logic, data structures, and so on that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices. As shown in FIG. 1, computer processing system 10 may be in the form of a general-purpose computing server 12. Computer server 12 may include a central processing unit (CPU) 16, storage 28, and bus 18.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer processing system 10 typically includes a variety of computer system readable media. Such media may be any available media that is accessible by computer processing system 10, and may include both volatile and non-volatile media, removable and non-removable media.

Storage 28 may include computer system readable media in the form of volatile storage 28.1, such as random access memory (RAM) 28.1.1 and cache memory 28.1.2, and in the form of non-volatile or persistent storage 28.2. Computer processing system 10 may further include other removable or non-removable, volatile or non-volatile computer system storage media. By way of example only, persistent storage 28.2 is for reading from and writing to a non-removable, non-volatile magnetic media (not shown and typically called a "hard drive"). Although not shown, a universal serial bus (USB) for reading from and writing to a removable, non-volatile solid-state memory, and an optical disk drive for reading from or writing to a removable, non-volatile optical disk such as a compact disk read only memory (CD-ROM), digital video disk read only memory (DVD-ROM) or other optical media can be provided. In such instances, each can be connected to bus 18 by one or more data media interfaces. As will be further depicted and described below, storage 28 may include at least one program product having a set (for example, at least one) of program modules that are configured to carry out the functions of embodiments of the invention.

Program modules including, for example, data loading tool 40; database 42; and data repository 44 are stored in storage 28 along with further program modules that support various embodiments but are not shown, including microprocessor firmware, boot strap program, operating system, and support programs. Each of the operating system, support programs, and data or some combination thereof may include an implementation of a networking environment. Data loading tool 40 may carry out the functions and/or methodologies of exemplary embodiments of the invention as described herein. Computer processing system 10 may also communicate with a user 8 through one or more input devices 14 and one or more output devices 24 via device interface 22. Input devices 14 and output devices 24 can include a keyboard, a pointing device, a printer, a scanner, or various other external input or output devices. Still yet, computer processing system 10 can communicate with one or more networks such as a local area network (LAN), a general wide area network (WAN), and/or a public network (for instance the Internet) via network adapter 20. As depicted, network adapter 20 may communicate with the other components of computer server 12 via bus 18. It should be understood that, although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Figure 2:
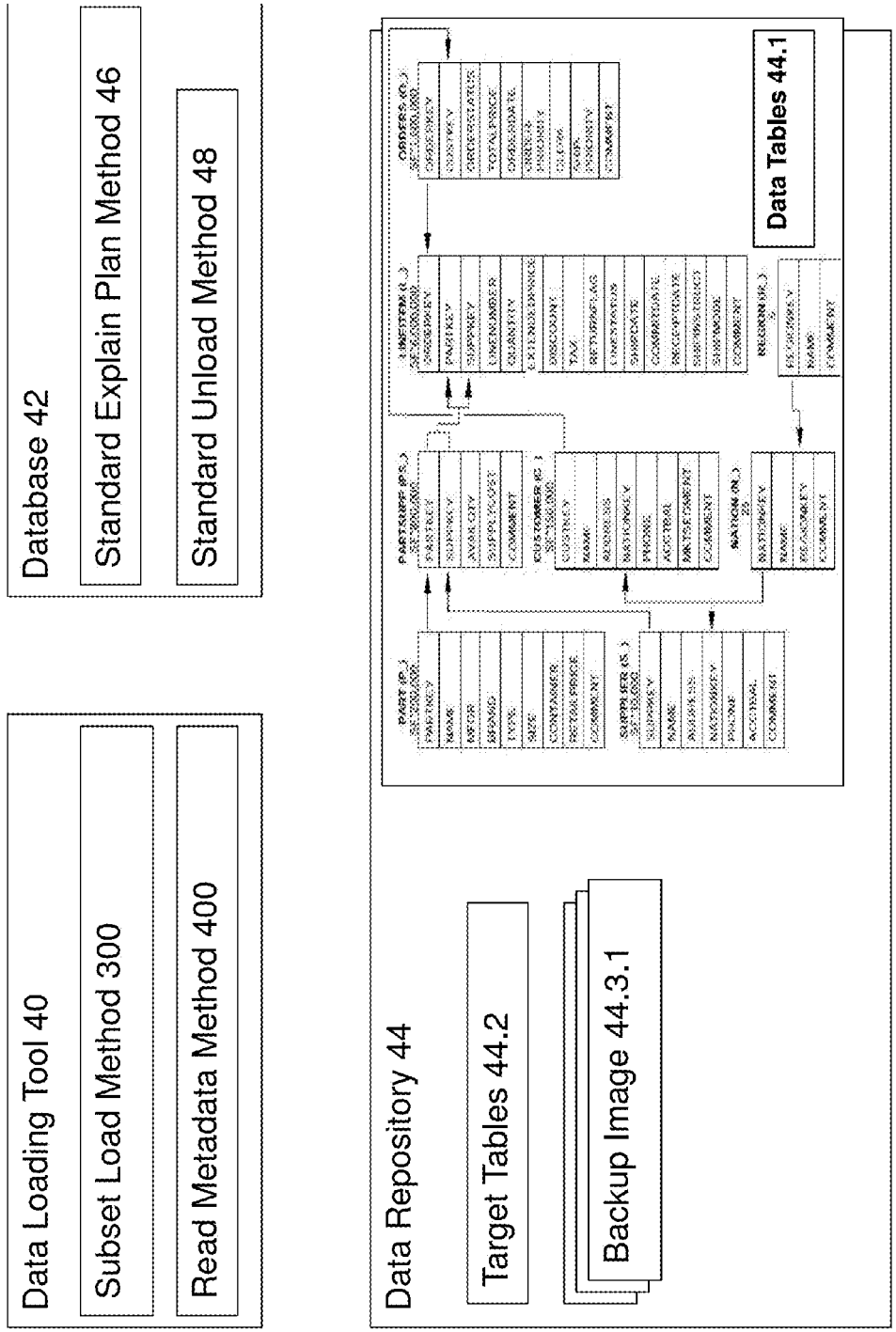
FIG. 2 is a component diagram of the system of an exemplary embodiment of the invention.

Referring to FIG. 2, an exemplary embodiment of the invention is shown. An exemplary embodiment is, or includes, a data loading tool with a facility to: analyze a subset statement representing the required subset of a relational database; extract the relevant subset of a table from the backup image; and load the subset into an empty target database.

An exemplary embodiment provides data extracted directly from a backup image at a low level of granularity. Database rows may be extracted for a complex query-like statement meeting applicable reporting and testing needs. The referential integrity between tables involved in the user provided subset statement may be preserved, using a structured query language (SQL) statement. The target database can have a topology completely different from the production database. For example, the target database can have tables that reside in different table spaces on different database partitions. In an exemplary embodiment, the subset statement may be based on SQL, but other database query languages may be used.

Although the term "backup image" is used in this disclosure, other forms of data serialization and any database image can be used. The latest database image may be used when extracting data, but in some embodiments, an interface may be provided for a user to choose another database image with a prior timestamp.

Exemplary embodiments may use existing tools for unloading data from a database image. One such existing tool, IBM InfoSphere Optim High Performance Unload (HPU), allows unloading of data directly from a database image (used for backup) on tape via IBM Tivoli Storage Manager (TSM) or from a disk for a given table using a SQL-like interface. In some embodiments, a statement used for unloading is SQL-like and contains no complex query constructs or joins. The statement for unloading can use WHERE clause filters to unload a subset of rows only for the given table. Furthermore, some embodiments allow the user to extract data for a specific range of a range partitioned (RP) table or data for a specific database node.

Some exemplary embodiments analyze a subset statement provided by a user representing a subset of all the data in the database, and query the database catalogue to determine the inter-table relationships by examining foreign key relationships. A field in a table that is declared a foreign key may contain only values from a parent table's primary key.

An exemplary embodiment may run a query extraction tool, such as a standard explain plan method, with the subset statement on the database to obtain an estimated number of rows for each table referenced in the subset statement. The query extraction tool need not execute the subset statement but may determine an access strategy given a query and may estimate of the number of operations based on the existing database catalogue statistics.

An exemplary embodiment may construct table statements (formed with pseudo-SQL, like the subset statements) for extracting data from a backup file for each table in turn to a flat control file. Table statements may include all other column filters on the tables specified in the subset statement. For range partitioned tables, a range statement in pseudo SQL may be constructed per each required range. The use of table statements for filtering during unload, as described herein, may allow for a faster overall unload and load of data subsets than that achieved by contemporary solutions. Such filtering may operate at a database system level and can be made transparent to a user or to an application running the database.

An exemplary embodiment may, further, determine an unload order to unload the table statements in the least time, and may unload the table statements according to that determined unload order. Unloading the table statements in the determined unload order may result in an increase in unload speed. The order determination may be made using a linear algorithm to find the sequence resulting in the least time for upload. Such processing of linear algorithms, however, has a high processing cost. Pragmatically, an exemplary embodiment may thus use a less processor intensive method to determine an optimum sequence to unload tables.

Tables with filter predicates in a subset statement may be unloaded before other tables. More specifically, tables with specified filter predicates may be unloaded before tables with no filter predicates explicitly specified in a subset statement. If the filter predicates for a table are not explicitly specified by the subset statement, they may be determined after the table with corresponding matching foreign keys is processed to provide the distinct list of foreign key values. This cycle may proceed until all the tables are processed. This may guarantee that only rows satisfying the subset statement are extracted, as requested by user. Filter predicates can be a primary key or another column in the same table. For a table with no associated filter predicate in the subset statement, its unload statement may be filtered using the list of distinct values from the joined column to the joined table that was previously loaded based on a predetermined priority order. A distinct value can be a foreign key or primary key, depending on whether this table is a fact table or a dimension table.

Tables existing in the same backup file may be processed in the same scan of a backup image, so as to avoid repeatedly scanning database images. Tables with the lowest expected number of rows may be processed first. Determining the lowest number of expected rows using a standard explain plan method may be an efficient determination, as this would an existing data structure and a standard method. Using a standard explain plan method may result in a faster determination of the unload speed than using a more exacting linear algorithm.

In an exemplary embodiment, the determined unload order may be determined by examining a query strategy from the production database based on the subset statement. A query strategy determination of unload order is likely an efficient determination, as it uses an existing mechanism and results in a faster determination of the unload speed than a linear algorithm.

The user may be prompted to add or edit the subset statement. An exemplary embodiment may prompt the user to add or edit a set of database constraints, whereby the set of database constraints may be used to configure the empty database target. For example, database constraints can include table characteristics, partition characteristics, or storage characteristics.

An exemplary embodiment of this disclosure may, in some cases, be a data loading apparatus for loading data from a backup image of a database. The apparatus may include a selector for selecting a subset statement defining a subset of the data in the database; an identifier for identifying tables of the database based on the database metadata; a writer for writing a target database having the structure but not the data of the identified tables; a builder for constructing table statements defining a subset of each table based on the subset statement; and an unloader for unloading selected data from the backup image into the target database using respective table statements as filters.

The data loading apparatus may further include a determination engine for determining an unload order that unloads the table statements in the least time and unloading the table statements in the determined order. Tables with filter predicates specified in a subset statement may be unloaded before other tables. Tables existing within a single backup file may be processed in the same scan of a backup image. Tables with the lowest expected number of rows may be processed first.

The unload order may be determined by examining a query strategy from the production database based on the subset statement. An exemplary embodiment may prompt the user to add or edit the subset statement. Such prompting may be provided by a user interface, enabling the user to add or edit a set of database constraints, whereby the set of database constraints may be used to configure the empty database target.

Referring back to FIG. 2, as shown, an exemplary embodiment may include the following components: data loading tool 40; database 42 and data repository 44.

Data loading tool 40 may include subset load method 300 and read metadata method 400.

Database 42 may be a standard database with standard database functionality and including a standard explain plan method 46 and a standard upload method 48 (but need not include the data that is stored separately in data repository 44).

Figure 5:
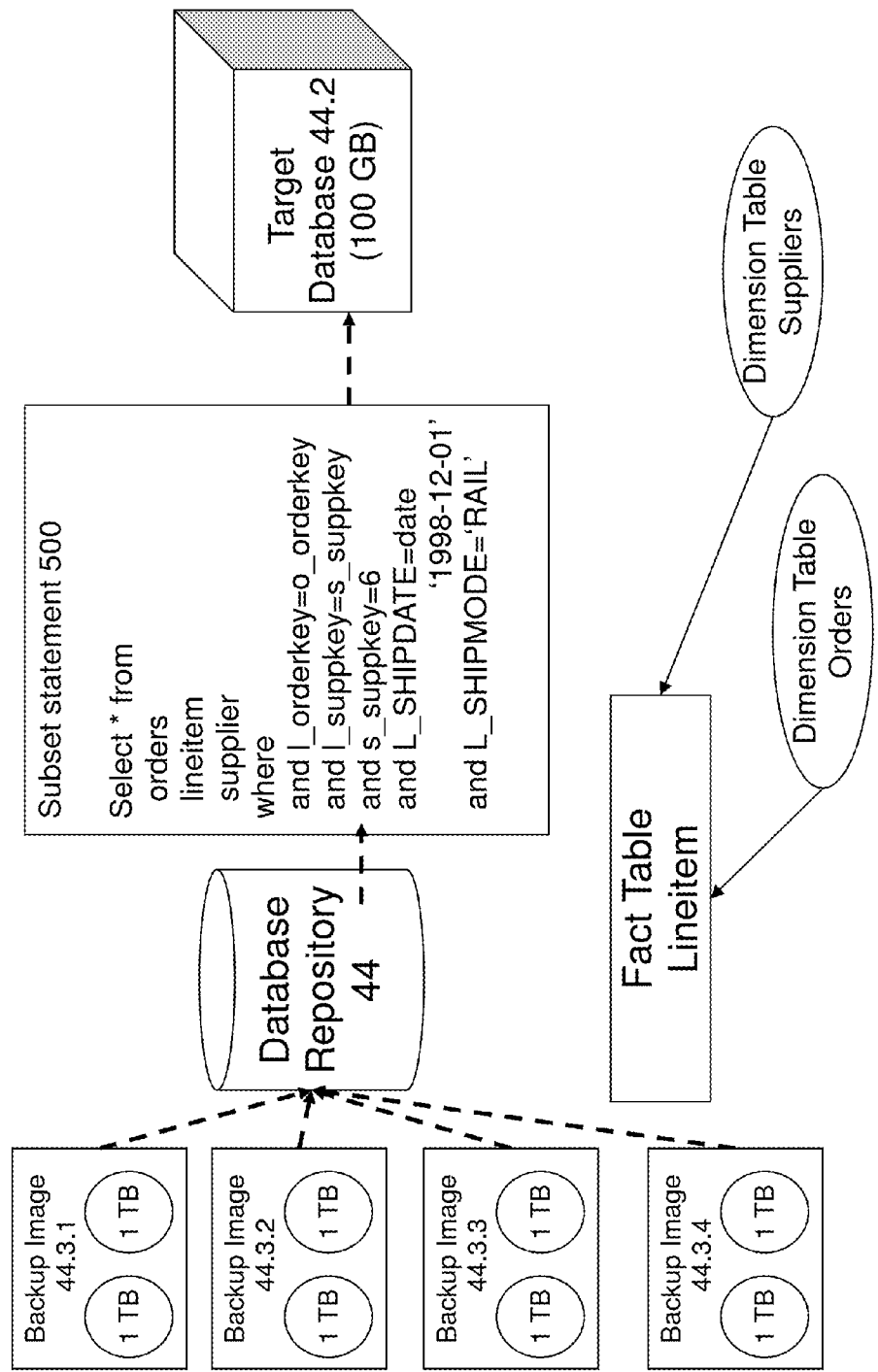
FIG. 5 is an example subset statement used for an exemplary embodiment.
Figure 6:
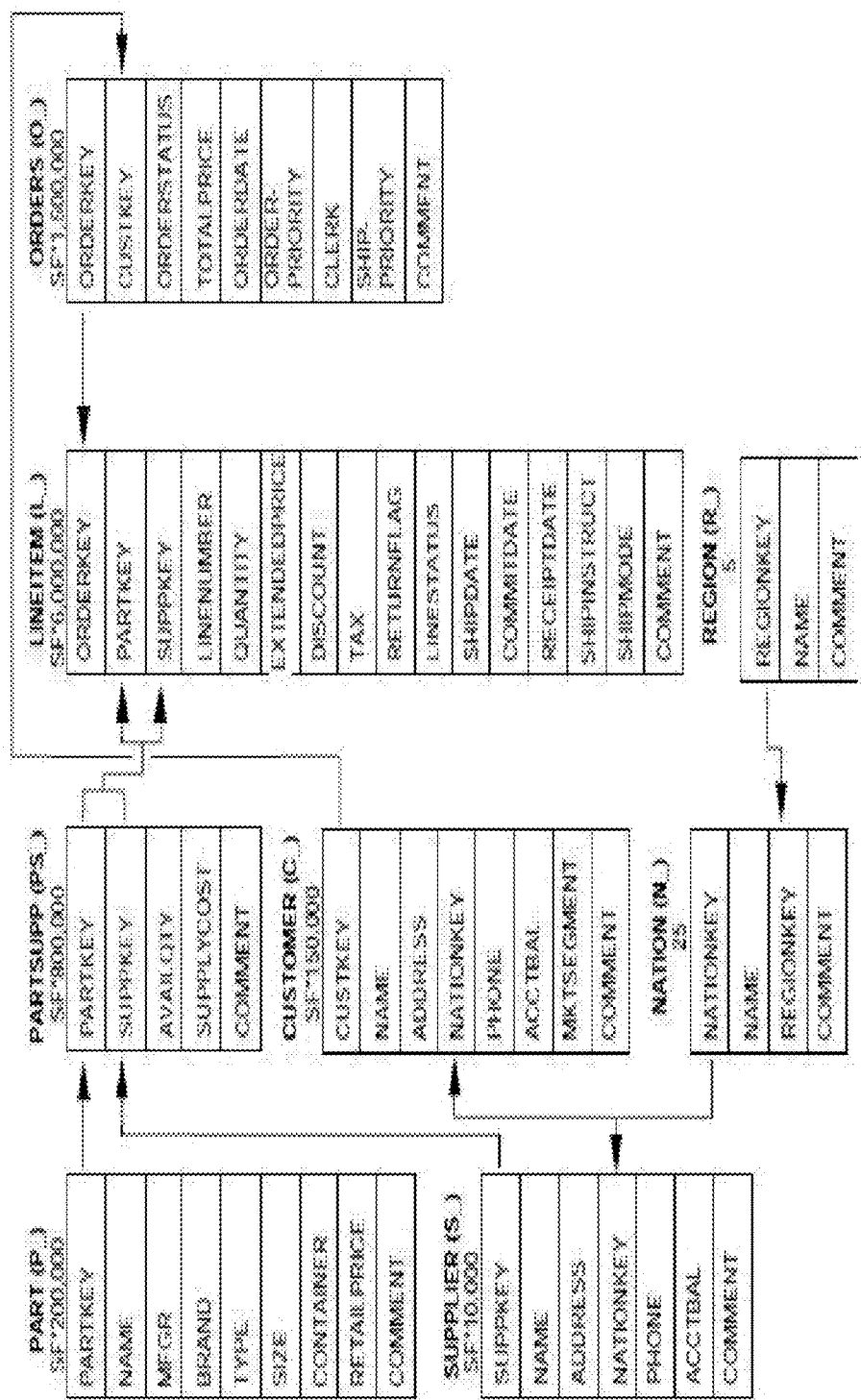
FIG. 6 is an example set of tables for an exemplary embodiment.

Data repository 44 may include data tables 44.1; target database 44.2; and backup images including back up image 44.3.1 (backup images 44.3.2 to 44.3.4 are shown in FIG. 5 but not FIG. 2). An example database comprising relational tables as shown in FIG. 6 will be described later.

Figure 3A:
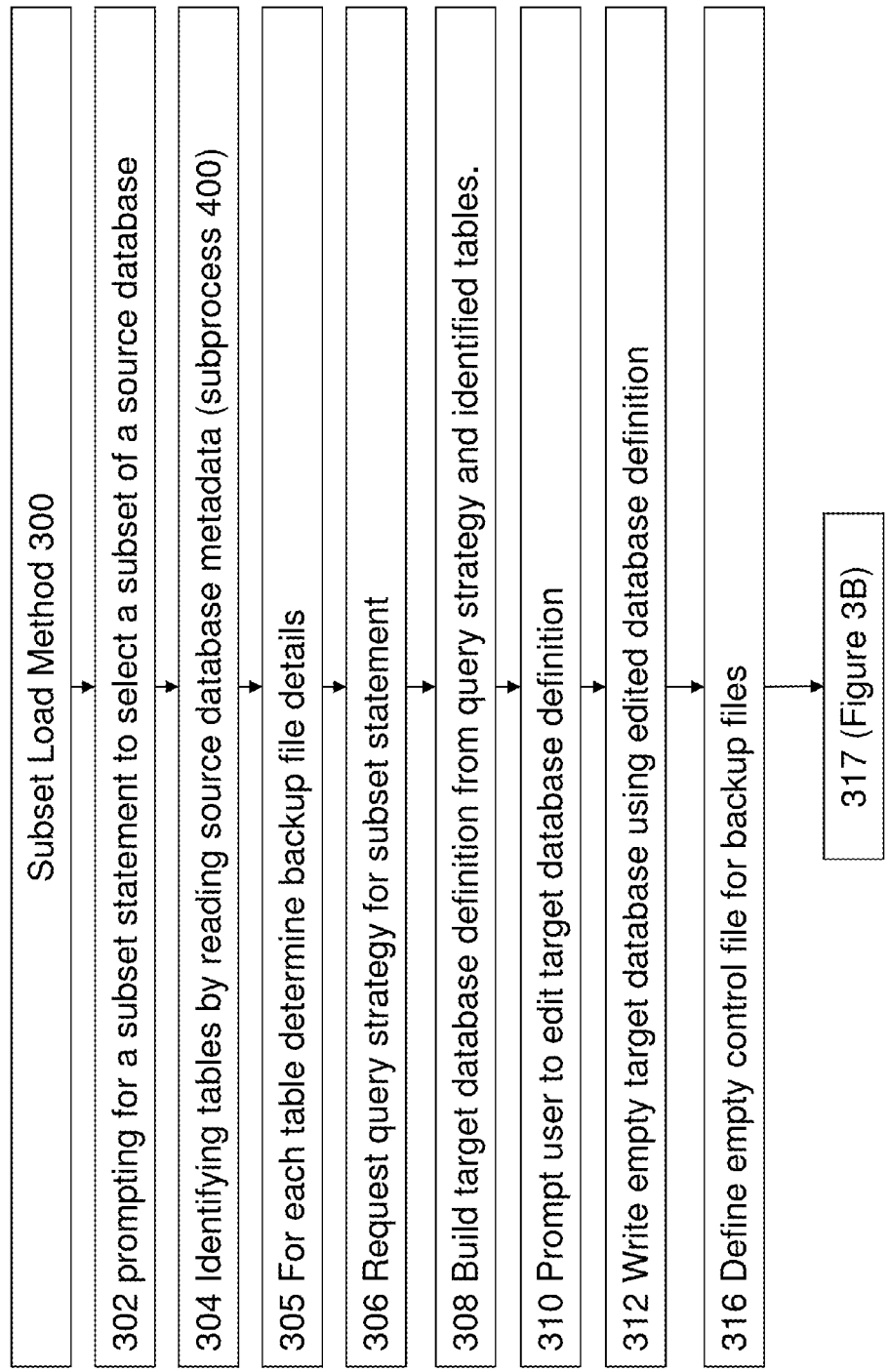
FIGS. 3A and 3B are flow diagrams of a process of an exemplary embodiment of the invention.
Figure 3B:
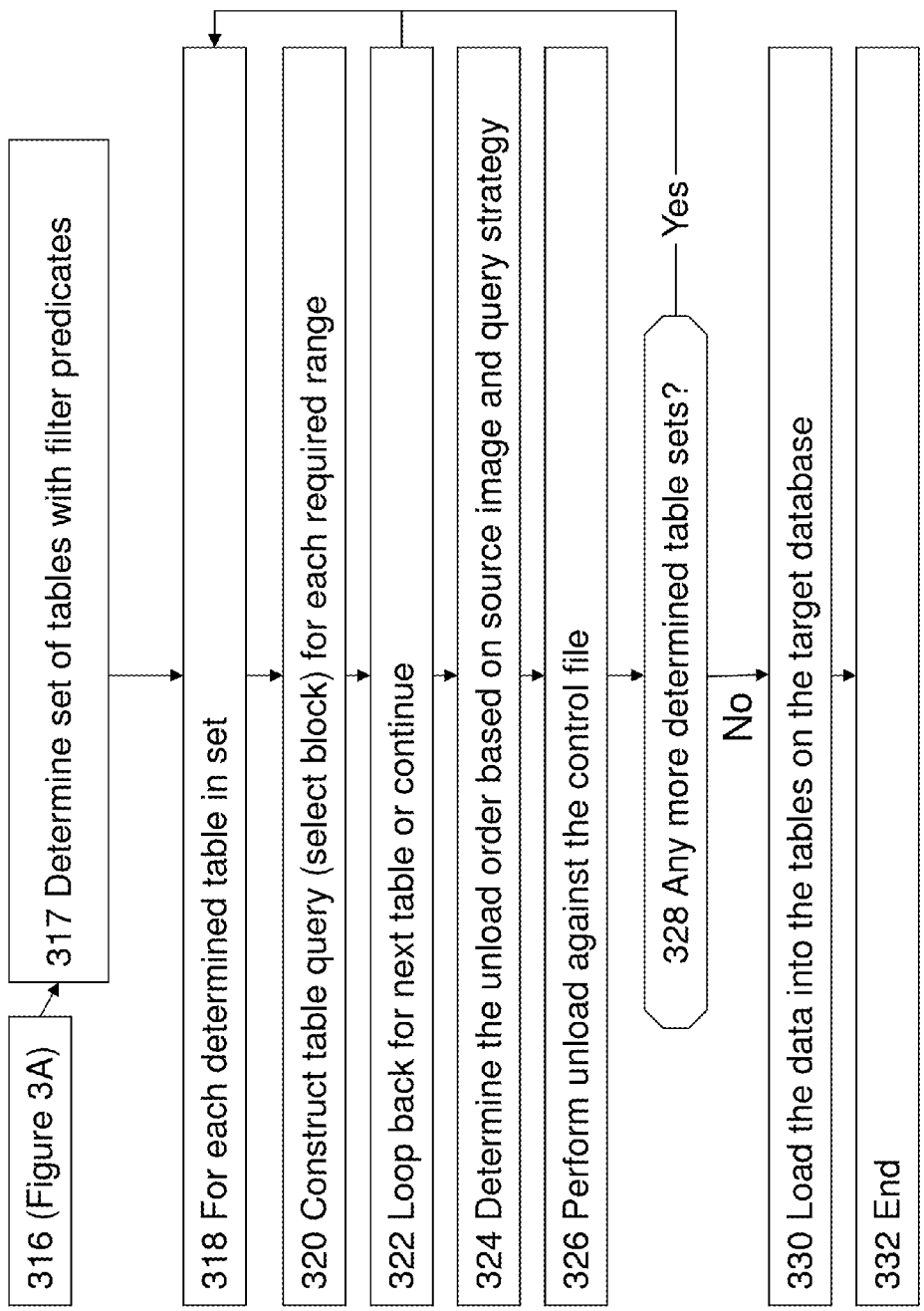

Referring to FIGS. 3A and 3B, subset load method 300 may include logical process blocks 302 to 332.

Block 302 is for prompting a user for a subset statement required for selecting a subset of data in a source database.

In some exemplary embodiments, the subset statement is identified from user input, but in other exemplary embodiments, the subset statement might be pre-stored. The subset statement may be based on structured query language (SQL).

Block 304 is for identifying tables in the source database by reading source database metadata. In an exemplary embodiment, the database metadata may be the database catalog taken from a source database or loaded from the backup image. The database metadata may include table structure (also known as database schema), including table dimensions and optimizer statistics. In an exemplary embodiment, subprocess 400 may be called to identify the type of tables including fact tables and dimension tables.

Block 305 is for determining which version of each table is to be used and in which corresponding backup image to find the table. By default, the latest backup image may be used to determine which version of a table to use, but a different table version can be determined if specified. A user can specify or be prompted to specify whether to use the default of a different table version. A user can also be prompted to specify extraction from incremental backups.

Block 306 is for determining a query strategy for the subset statement. In an exemplary embodiment, a query strategy for the subset statement may be requested using standard explain plan method 46 on the source database.

Standard explain plan method 46 may be run against a user SQL statement, and the relevant operators may be checked to obtain the estimated number of rows for each table. Rows can be retrieved by the database engine either using indexes or table scans. An explain plan output file may use an index scan operator (IXSCN) for index scan and a table scan operator (TBSCN) for table scan operation. Each of them may provide the "Estimated number of rows" field, which is the estimated number of rows returned by table in the SQL statement execution. This information may be used by the tool to make the final decision on the order of unloading tables. For example, if Table1 (Estimated Rows: 100) and Table2 (Estimated Rows: 2000) are in the same backup file but Table3 (Estimated Rows: 2890) is in another backup file, Table 1 and Table 2 may be processed in parallel and before Table3 because their Total Row cardinality (2100) is lower than the one of the Table3.

Block 308 is for building a target database definition from the query strategy and the identified tables.

Block 310 is for prompting a user to edit the target database definition. The target database may be smaller than the source data base with a simpler topology (e.g., fewer nodes, fewer database partitions, and fewer table spaces), and a user may want to make further changes to the database definition for the tables and their associated table spaces. For example, a user might like to have fewer ranges and table spaces for some of the tables. The user may be prompted to supply database characteristics for the target topology, and the resulting data definition statement, such as a data definition language (DDL), may be applied against the target database.

Block 312 is for writing an empty target database using edited target database definition.

Block 316 is for defining an empty control file as intermediary storage for source database.

Block 317 is for determining a set of tables with filter predicates in the subset statement. Subsequently, a different block of the method 300 may determine further sets of tables.

Block 318 defines a for-next loop for each identified table in the determined set of tables. A loop table may start as the first identified table that comprises a determined filter predicate and may end as a last identified table that comprises a determined filter predicate in the backup file.

Block 320 constructs a table query and unload block for a loop table. A set of table queries and unload blocks may be built up as this block is performed for each table in the for-next loop. The tables having filter predicates specified by the query statement (usually a dimension table) and the tables with no filter predicates present (usually fact tables) may be processed with each table having a separate unload block in the same unload control file. Other column filters may be included in the table query, and other information such as database partition node number and backup timestamp may be provided in the unload block. If specific table ranges are required, a separate unload block may be created for each. All the tables may have their required rows extracted to a flat file.

Block 322 loops back to block 318 for a further loop table, or else the method 300 moves to block 324.

Block 324 determines the unload order of the tables from the backup image based on the filter predicates, tables, subset statement, and backup files details. Ordering the determined tables by estimated number of rows (using standard explain plan method 46 output) helps to determine the unload order whereby tables with fewer rows will be unloaded first.

Block 326 performs an unload against the control file as defined by the determined unload order.

The flat files may be analyzed to extract distinct foreign keys that are the primary keys for the tables joined that could not be determined previously in block 317. Once the tables have their primary keys determined, a control file may be created similar to that in the first block for the unload process.

Block 328 loops back to block 318 with a new set of determined tables if there are remaining tables. A new set of determined tables may be determined by looking at the previously determined tables and the total set of identified tables. The first determination may look for remaining tables in the same database image as previously determined tables. When there are no remaining tables, the processing moves to block 330. Once the tables are extracted with the relevant rows, other tables may be located for which filter predicates are not specified.

Block 330 is for loading the data into the empty target database.

Block 332 is the end of data subset upload method 300.

Figure 4:
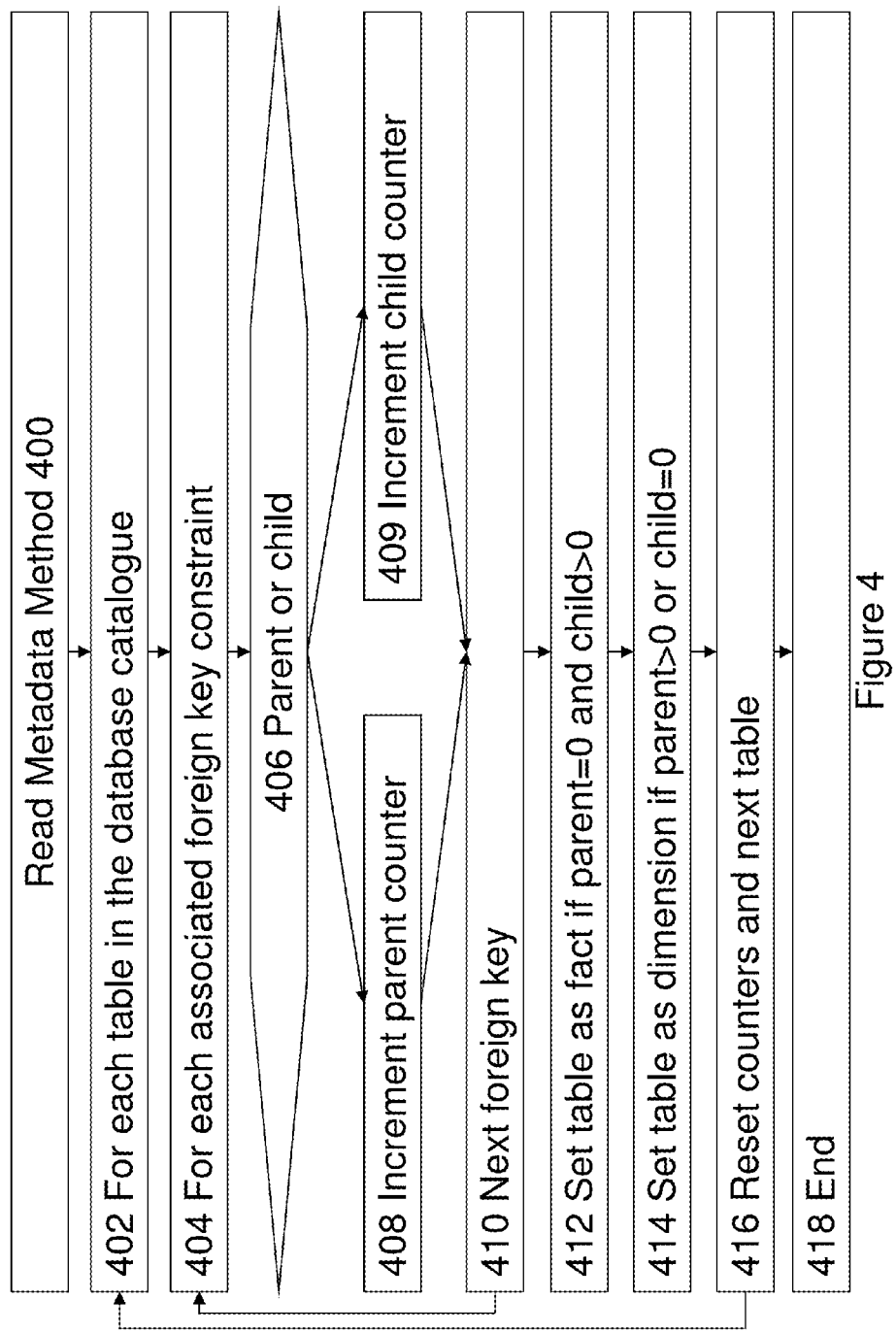
FIG. 4 is a flow diagram of a sub-process of an exemplary embodiment.

Referring to FIG. 4, read metadata method 400 may include logical process blocks 402 to 418. The production database may include the definitions of foreign keys, which may constrain the data in referenced tables such that every row in the child table must have a row in the parent table. Fact tables may typically have several parent dimension tables. Dimension tables may typically have one or more child fact tables.

Block 402 is for defining a for-next loop with a table loop variable starting as a first table in the database catalogue and ending as the last table in the database catalogue.

Block 404 is for defining a for-next loop with a foreign key loop variable starting as the first foreign key in the table loop variable and ending as the last foreign key.

Block 406 is for deciding if the table loop variable is a parent or a child.

Block 408 is for incrementing the parent counter if the table loop variable is a parent.

Block 409 is for incrementing a child counter if the table loop variable is a child.

Block 410 is for looping back to block 404 for the next foreign key loop variable.

Block 412 is for characterizing the table of the table loop variable as a fact table if the parent counter=0 and the child counter>0.

Block 414 is for defining the table of the table loop variable as a dimension table if the parent counter>0 or the child counter=0.

Block 416 is for resetting the parent and child counters and jumping to block 402 for the next table if there is one. Otherwise, the method 400 may continue to block 418.

Block 418 is the end of the read metadata method 400. Referring to FIG. 5, example subset statement 500 is shown representing transformation of backup images 44.3.1 to 44.3.4 in database repository 44 to tables in target database 44.2. Subset statement 500 may include, for example, the following structured query language like statements:

Select * from
   orders
   lineitem
   supplier
where
   and l_orderkey=o_orderkey
   and l_suppkey=s_suppkey
   and s_suppkey=6
   and L_SHIPDATE=date '1998-12-01'
   and L_SHIPMODE='RAIL'

The above statement is described in expanded terms as follows: select all rows from the following tables (orders; lineitem; and supplier), where the value in a field l_orderkey (l_orderkey is an order key field) is the same as the value in field o_orderkey (o_orderkey is another order key field); and the value in a field l_suppkey (a supplier key field) is the same as a value in the field s_suppkey (another supplier key field); and s_suppkey is 6; and L_SHIPDATE (shipping date) is equal to '1998-12-01' and the L_SHIPMODE (shipping mode) is equal to 'RAIL'. In this example, the database loading tool establishes that lineitem is a fact (parent) table and that supplier and orders are dimension (child) tables, as represented by the respective arrows from dimension table orders and suppliers table to fact table lineitem.

Referring to FIG. 6, an example set of database tables may include related tables: Lineitem table; Orders table; Region table; Nation table; Customer table; Supplier table; and Part table. A data uploading tool may trace the relationships, counting several child relationships but no parent relationships for Lineitem table; and Lineitem table may thus be determined a fact table. The data uploading tool may parse the relationships for Orders table and Partsupp table, counting one or more parents each; Orders table and Partsupp may thus be determined as dimension tables of the Lineitem table. This schema is in essence a snowflake schema, and the Part and Supplier tables may be in turn determined dimension tables of the Partsupp table.

Figure 7:
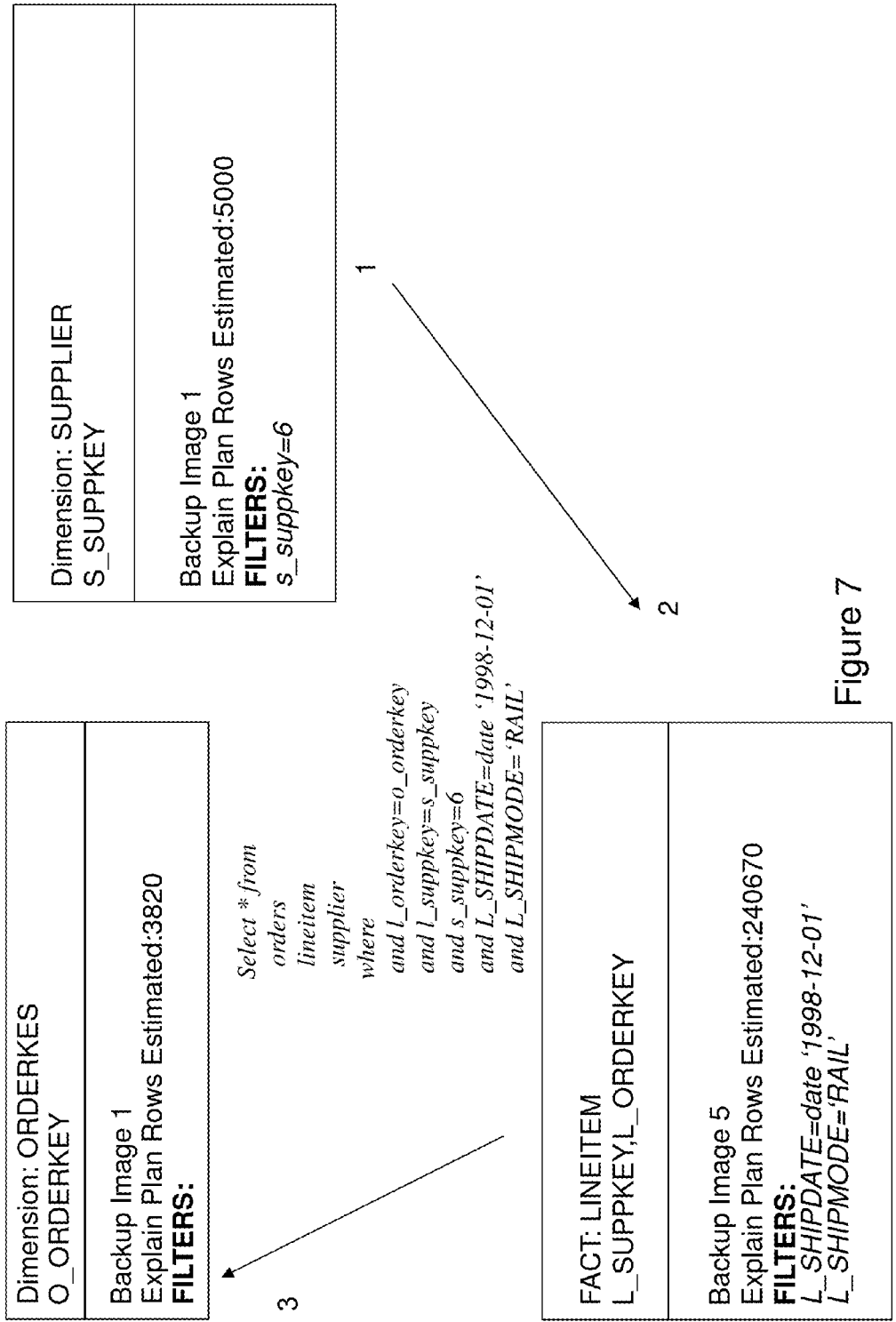
FIG. 7 is an example set of table metadata.

Referring to FIG. 7, an example set of identified tables for subset statement 500 is described. Data loading tool 40 may process the tables in the following order:

Priority 1: Process first dimension (parent) tables for which there are filter predicates applied in the subset statement. There need be no difference whether the filter predicate is applied to the primary key column or a property column on the dimension tables.

Priority 1 is the highest priority when following the access plan returned from the explain plan utility to determine an unload strategy.

Priority 2: Process fact tables that are joined to the dimension tables that were filtered during Priority 1. Essentially, unload the fact table rows for which the foreign key column data is equal to the (parent) dimensions key values as unloaded in Priority 1.

Priority 3: Process dimension tables that have no filters applied using the distinct set of foreign key values unloaded from the associated fact table in Priority 2.

Priority 4: Process tables in parallel that reside in the same backup file to avoid repeated backup scans.

Priority 5: Process tables first with lower total estimated number of rows by Explain Plan.

Data loading tool 40 may determine the following unload order: (1) Unload dimension table SUPPLIER with filter predicate S_SUPPKEY=6. (2) Unload fact table LINEITEM which is joined to SUPPLIER table on l_suppkey=s_suppkey=6. (3) Unload dimension table ORDERS using the distinct set of foreign key values for column o_orderkey unloaded in (2) for column l_orderkey.

A computer program aspect of an exemplary embodiment for use with a computer system includes a series of computer-readable instructions either fixed on a tangible medium, such as a computer readable medium, for example, an optical disk, magnetic disk, or solid-state drive, or transmittable to a computer system using a modem or other interface device over either a tangible medium, including but not limited to optical or analogue communications lines, or intangibly using wireless techniques, including but not limited to microwave, infrared, or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

A data carrier aspect of an exemplary embodiment includes functional computer data structures to, when loaded into a computer system and operated upon thereby, enable said computer system to perform some or all the steps of the method. A suitable data-carrier could be a solid-state memory, magnetic drive, or optical disk. Channels for the transmission of data may likewise include storage media of all descriptions as well as signal-carrying media, such as wired or wireless signal-carrying media.

It will be clear to one of ordinary skill in the art that all or part of the logical processes of an exemplary embodiment may be alternatively embodied in a logic apparatus or a plurality of logic apparatus, including, for example, logic elements arranged to perform the logical processes of the method and that such logic elements may comprise hardware components, firmware components, or a combination thereof.

It will be equally clear to one of skill in the art that all or part of the logic components of an exemplary embodiment may be alternatively embodied in a logic apparatus having logic elements to perform some or all processes of the method, and that such logic elements may include components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer-implemented method of deploying a service comprising steps of deploying computer program code operable to, when deployed into a computer infrastructure and executed thereon, cause the computer system to perform all the steps of the method.

It will be appreciated that the method and components of an exemplary embodiment may alternatively be embodied fully or partially in a parallel computing system having two or more processors for executing parallel software.

Figure 8:
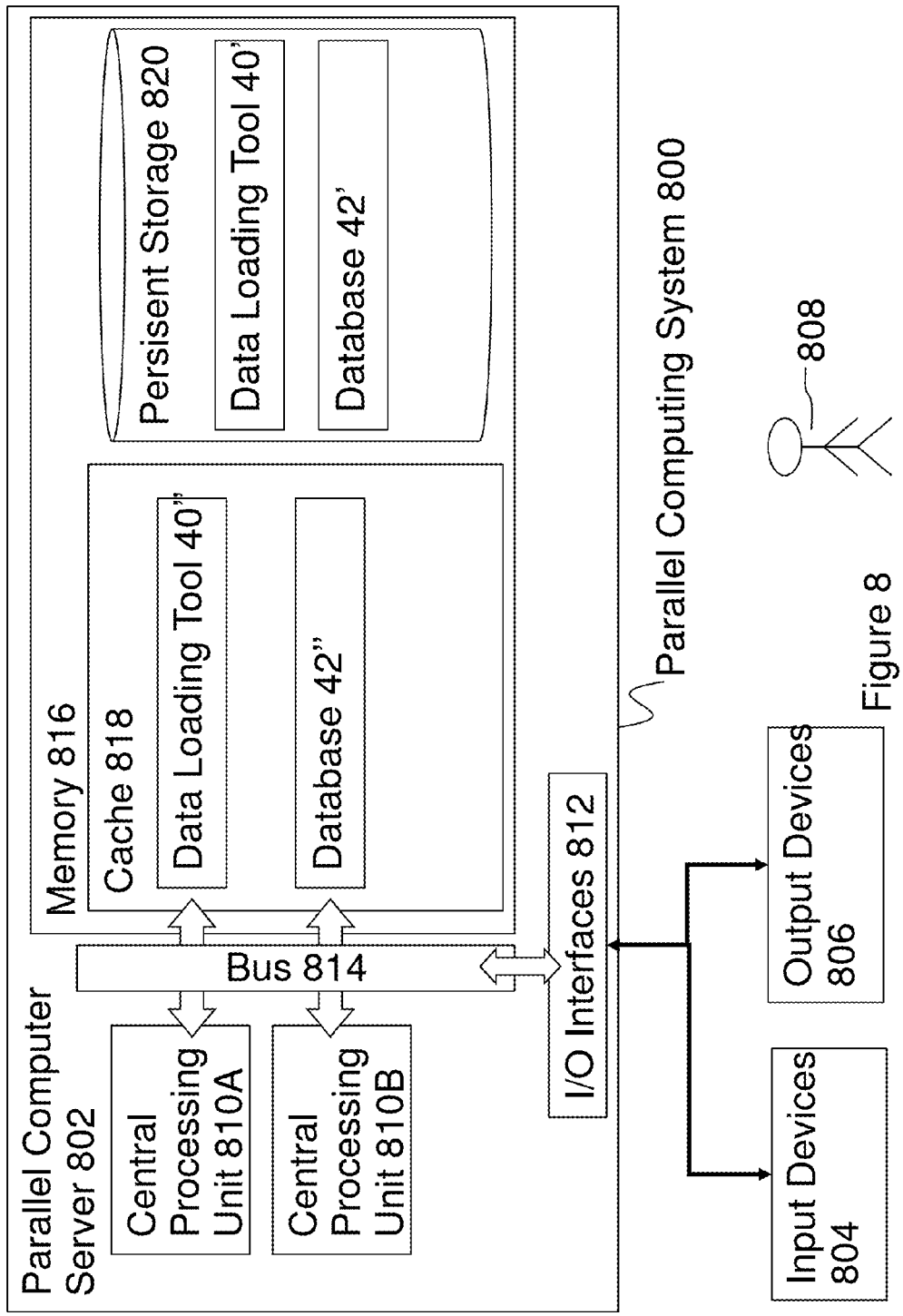
FIG. 8 is a deployment diagram of an exemplary parallel computing embodiment of the invention in a parallel computing system.

Referring to FIG. 8, an example parallel computing embodiment includes parallel computing system 800 with two central processing units 810A and 810B for parallel processing of instructions. Parallel computing system 800 may be described in the general context of parallel computer system executable instructions, such as parallel program modules, being executed by parallel computing system 800. Generally, parallel program modules may include routines, programs, objects, components, logic, data structures, that perform particular tasks or implement particular abstract data types. Parallel computing system 800 may include parallel computer server 802; input devices 804; and output devices 806. User 808 provides input and receives output from the parallel computing system 800 but is not part of parallel computing system 800. Parallel computer server 802 may include processing units 810A and 810B; input and output (I/O) interface 812; bus 814 and memory 816.

I/O interface 812 may provide a gateway between the parallel computer server 802 and input devices 804 and output devices 806.

Bus 814 represents one or more of any of several types of bus structures, including a memory bus or memory controller, a peripheral bus, an accelerated graphics port, and a processor or local bus using any of a variety of bus architectures.

Memory 816 may include computer system readable media in the form of volatile memory, such as random access memory (not shown), non-volatile or persistent storage 820, and cache memory 818.

In the example parallel computing embodiment, program modules include data loading tool 40' and database 42'. Data loading tool 40' and database 42' may be stored in persistent storage 820, by way of example and not limitation, along with an operating system, one or more application programs, a database management system, and other program modules. Each of the operating system, one or more application programs, other program modules, and program data, or some combination thereof may include an implementation of a networking environment. Data loading tool 40' may be provided to carry out the functions and/or methodologies of an exemplary embodiment in a parallel environment.

In operation, data loading tool 40' and database 42' may be extracted from persistent storage 820 and loaded into cache memory 918 so that they may be executed in parallel by the processing units.

Parallel computer system 800 may communicate with input devices 804 and output devices 806 via I/O interface 812. Input devices 804 can include a keyboard, a pointing device, a scanner, or any device converting user input to signal data. Output devices 806 may include a display, printer, speaker, or any device converting signal data to output for the user.

In this example two processing units are shown, but three or more could be used to build a parallel embodiment. In the described parallel computing embodiment, the parallel computer server 802 includes separate processing units. In an alternative parallel computing embodiment, a parallel computer server may include a single processing unit having multiple cores. In an alternative virtual parallel computing embodiment, a computer server could comprise a virtual computing environment and multiple virtual parallel processing units or a single virtual processing unit with multiple virtual cores. Other configurations may also be used.

It will be clear to one skilled in the art that many improvements and modifications can be made to the foregoing exemplary embodiments without departing from the scope of the present invention.

What is claimed is:

1. A method for loading data from a backup image of a database, the method comprising:
    selecting a subset statement defining a subset of the data in the database; identifying tables of the database based on metadata of the database;
    writing a target database having a structure but not the data of the identified tables;
    constructing, by a computer processor, one or more table statements defining a subset of each identified table based on the subset statement, wherein the subset of each identified table includes particular rows of a corresponding table;
    determining an unload order to unload the table statements in the least time, wherein the unload order specifies unloading the identified tables having filter predicates specified in the subset statement before other tables and the unload order specifies that unloading the identified tables having the lowest expected number of rows are processed first; and
    unloading selected data from the backup image into the target database in the determined unload order using respective table statements as filters.

2. The method according to claim 1, wherein the unload order further specifies that the identified tables existing in a single backup file are processed in the same scan of the backup image.

3. The method according to claim 1, wherein the unload order further specifies that the identified tables having the lowest expected number of rows are processed first.

4. The method according to claim 1, wherein the determined unload order is determined by examining a query strategy from the database based on the subset statement.

5. The method according to claim 1, further comprising prompting a user to modify the subset statement.

6. The method according to claim 1, further comprising:
    prompting a user to modify a set of database constraints; and
    configuring an empty database target with the database constraints.

7. The method according to claim 1, further comprising using a latest image of the database as the backup image by default.

8. The method according to claim 7, further comprising providing an interface for a user to choose a database image other than the latest image as the backup image.

9. A computer program product comprising a non-transitory computer readable storage medium having computer readable program code embodied thereon, wherein the computer readable program code is executable by a processor to perform a method comprising:

selecting a subset statement defining a subset of data in a database; identifying tables of the database based on metadata of the database;

writing a target database having a structure but not the data of the identified tables;

constructing one or more table statements defining a subset of each identified table based on the subset statement, wherein the subset of each identified table includes particular rows of a corresponding table;

determining an unload order to unload the table statements in the least time, wherein the unload order specifies unloading the identified tables having filter predicates specified in the subset statement before other tables and the unload order specifies that unloading the identified tables having the lowest expected number of rows are processed first; and unloading selected data from a backup image into the target database using respective table statements as filters in the determined unload order.

10. The computer program product according to claim 9, wherein the unload order further specifies that the identified tables existing in a single backup file will be processed in the same scan of the backup image.

11. The computer program product according to claim 9, wherein the unload order further specifies that the identified tables having the lowest expected number of rows are processed first.

12. The computer program product according to claim 9, wherein the determined unload order is determined by examining a query strategy from the database based on the subset statement.

13. A data loading apparatus for loading data from a backup image of a database, the apparatus comprising:

a selector configured to select a subset statement defining a subset of the data in the database;

an identifier configured to identify tables of the database based on metadata of the database;

a writer configured to write a target database having a structure but not the data of the identified tables;

a builder configured to construct one or more table statements defining a subset of each identified table based on the subset statement, wherein the subset of each identified table includes particular rows of a corresponding table;

a determination engine configured to determine an unload order to unload the table statements in the least time, wherein the unload order specifies unloading the identified tables having filter predicates specified in the subset statement before other tables and the unload order specifies that unloading the identified tables having the lowest expected number of rows are processed first; and an unloader configured to unload selected data from the backup image into the target database using respective table statements as filters in the determined unload order.

14. The data loading apparatus according to claim 13, further comprising a user interface configured to prompt a user to modify the subset statement.

15. The data loading apparatus according to claim 13, further comprising a user interface configured to prompt a user to modify a set of database constraints, wherein the set of database constraints are used to configure the database target.

16. The data loading apparatus of claim 13, the builder being further configured to use a latest image of the database as the backup image by default.

17. The data loading apparatus according to claim 13, wherein the unload order further specifies that the identified tables existing in a single backup file will be processed in the same scan of the backup image.

18. The data loading apparatus according to claim 13, wherein the unload order further specifies that the identified tables having the lowest expected number of rows are processed first.

* * * * *